(12) United States Patent
Nakanishi et al.

(10) Patent No.: US 6,236,669 B1
(45) Date of Patent: May 22, 2001

(54) LD/PD MODULE AND LED/PD MODULE

(75) Inventors: Hiromi Nakanishi; Yoshiki Kuhara, both of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/255,343

(22) Filed: Feb. 23, 1999

(30) Foreign Application Priority Data

Feb. 23, 1998 (JP) .................................................. 10-058806

(51) Int. Cl.[7] ........................................................ H01S 3/18
(52) U.S. Cl. ............................................... 372/43; 372/50
(58) Field of Search ...................................... 372/43, 50, 6

(56) References Cited

U.S. PATENT DOCUMENTS 5,787,215 * 7/1998 Kuhara et al. ......................... 372/43

FOREIGN PATENT DOCUMENTS 7-318764   12/1995 (JP) .

OTHER PUBLICATIONS

Nagakura et al., "Study On High Speed MT Connector Assemble Method", NTT Telecommunications Field Systems R & D Center, Electron Information Communication Autumn Seminar, 1993.

Nakagawa et al., "Passive–Aligned LD Module with Monitor–PD on a Silicon Platform", Fujitsu Labortories LTD., Electron Information Communication General Seminar, 1996.

Ogusu et al., "Receptacle Type Bi–Directional WDM Module 1", Toshiba R & D Center, The 1996 IEICE Electronics Society Conference, C–208, 1996, p. 208.

Uno et al., "Hybridly Integrated LD/PD Module with Passive–Alignment Technology", Electronics Research Labortory, Matsushita Electronics IND. Co., LTD., The 1997 IEICE Electronics Society Conference, C–3–89, 1997, p. 198.

Uchida et al., "Low–Cost Hybrid WDM Module Consisting of a Spot–Size Converter Integrated Laser Diode and a Waveguide Photodiode on a PLC Platform for Access Network Systems", IEICE Trans. Electron., vol. E80C, No. 1, Jan. 1997, p. 88.

* cited by examiner

Primary Examiner—Leon Scott, Jr.
(74) Attorney, Agent, or Firm—Pillsbury Winthrop LLP (57) ABSTRACT

The module has a planar platform. A straight light guide is formed on the planar platform for guiding incoming light and outgoing light. A filter is interposed slantingly in the light guide for reflecting a part of light propagating in the light guide but for allowing the rest of the light to pass through. An LD or LED is mounted at an extension of the light guide for producing sending signal light and introducing the sending light into the light guide. A photodiode is mounted on the platform at a point on a path of the reflected light for sensing the incoming (receiving signal) light. Guide pins are fixed to the platform for attaching to and detaching from an optical connector having holes and an optical fiber. In the attached state, the end of the light guide of the module faces the end of the fiber in the connector.

25 Claims, 10 Drawing Sheets

LD/PD MODULE AND LED/PD MODULE

BACKGROUND OF THE INVENTION

1. Field of the Invention

This invention relates to an LD/PD (laser diode/photodiode) module or an LED/PD (light emitting diode/photodiode) module as a sending/receiving apparatus used at base ports (broadcasting station) and subscribers in a unidirectional or bidirectional optical communication system which transmits optical signals of different wavelength in a unidirectional direction or bidirectional directions. In particular, this invention relates to an LD/PD or an LED/PD module which ensures facile attachment to and detachment from an optical connector. The word "LD/PD module" is adopted to signify both an "LD/PD module" and an "LED/PD module" hereafter for simplicity. At a subscriber port, an incoming light is called "receiving signal light" and an outgoing light is called "sending signal light".

This application claims the priority of Japanese Patent Application No.10-58806(58806/1998) filed Feb. 23, 1998 which is incorporated herein by reference.

2. Description of Related Art

[EXPLANATION OF BIDIRECTIONAL OPTICAL COMMUNICATION]

Recent development of technology has reduced transmission loss of optical fibers and has improved the properties of semiconductor laser diodes (hereafter indicated as LDs) and semiconductor photodiodes (hereafter indicated as PDs). The improvements of fibers, LDs and PDs enable us to transmit various types of information by light signals. The transmission is called "optical communication", since light signals carry information. The types of information for sending or receiving at stations or at subscriber ports are, for example, telephones, facsimiles or televisions. In particular, people have vigorously tried optical communication based on long wavelength light (near infrared), for example, of a 1.3 $\mu$m wavelength or of a 1.55 $\mu$m wavelength. Recently bidirectional transmission attracts attention, since only a single optical fiber can send signals both in a forward direction and in a backward direction at the same time. The system of the communication is called a "bidirectional communication system". Fortunately the bidirectional system saves one optical fiber.

Figure 1:
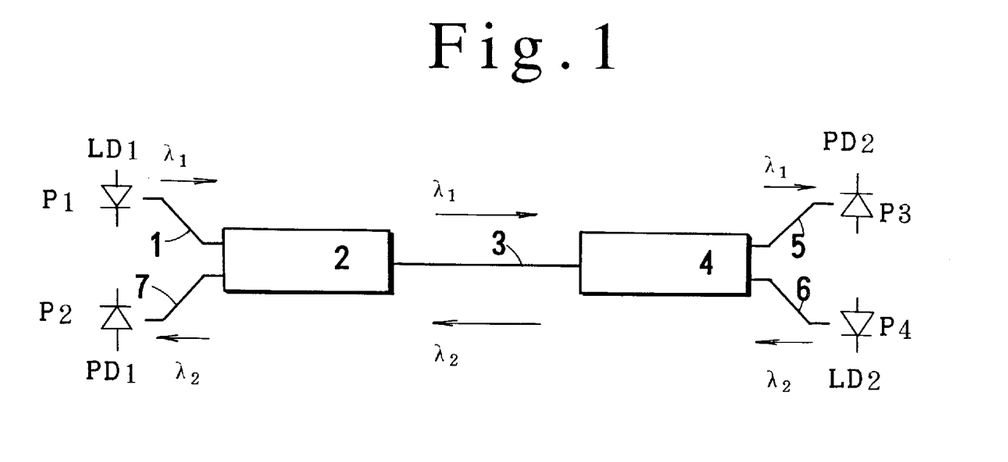
FIG. 1 is a schematic diagram of multiwavelength bidirectional optical communication system.

FIG. 1 schematically indicates a multiwavelength bidirectional optical communication system which adopts a plurality of wavelengths for sending signals simultaneously both in a forward direction and in a backward direction.

One station is connected to a plurality of subscribers (ONUs) by optical fibers. Although FIG. 1 shows only a single subscriber for drawing convenience, many subscriber ports are connected to the central station. The fiber from the station branches at many bisecting points into a plurality of fibers linking with individual subscribers.

The central station amplifies the signals of telephones or televisions as digital signals or analog signals and drives a semiconductor laser (LD1) which produces $\lambda 1$ light responsive to the amplified signals. The light of $\lambda 1$ emitted from the LDI (P1) enters an optical fiber 1 as light signals of $\lambda 1$. A wavelength division multiplexer (WDM) 2 introduces the $\lambda 1$ light into an intermediate optical fiber 3. Another wavelength multiplexer (WDM) 4 allocates the $\lambda 1$ light to an optical fiber 5. A photodiode (PD2) senses the $\lambda 1$ signals for converting the optical signals to electric signals (P3). A receiver apparatus on the subscriber side amplifies and processes the electric signals (P3) for reproducing a voice or image. The signals flowing from the station to the subscribers are called "downward signals". The direction is called a "downward direction".

On the contrary, a subscriber converts electric signals of a facsimile or a telephone into $\lambda 2$ light signals by a semiconductor laser diode (LD2) which oscillates at a wavelength $\lambda 2$ (P4). Going into a fiber 6, the $\lambda 2$ light passes the WDM 4, propagates in the intermediate optical fiber 3 to the station. The WDM 2 allocates the $\lambda 2$ light into a fiber 7. A photodiode (PD1) senses the $\lambda 2$ light for converting into electric signals (P2). Converters or signal processing circuits on the station side regenerate telephone voice or facsimile images. The direction of the signal flow from the subscribers to the station is called an "upward direction". The signals are called "upward signals".

The above system appropriates $\lambda 1$ to downward signals and $\lambda 2$ to upward signals exclusively. Another system uses only one wavelength in common for both upward and downward signals. A further system doubly allocates two wavelengths $\lambda 1$ and $\lambda 2$ both for upward and downward signals. Separation of two wavelengths is an important problem in the optical communication system which carries different wavelength signals in an optical fiber.

[Explanation of wavelength division multiplexer]

Both the station and the subscribers require a device for discriminating wavelengths and separating one wavelength from others. A WDM is a device having such a function. In FIG. 1, the WDMs 2 and 4 play the role of distinguishing and separating different wavelengths. A WDM either joins $\lambda 1$ to $\lambda 2$ for introducing them into a fiber or extracts only one wavelength light from two wavelengths propagating in a fiber. WDMs play an important role in multiwavelength bidirectional optical communication systems.

Figure 2:
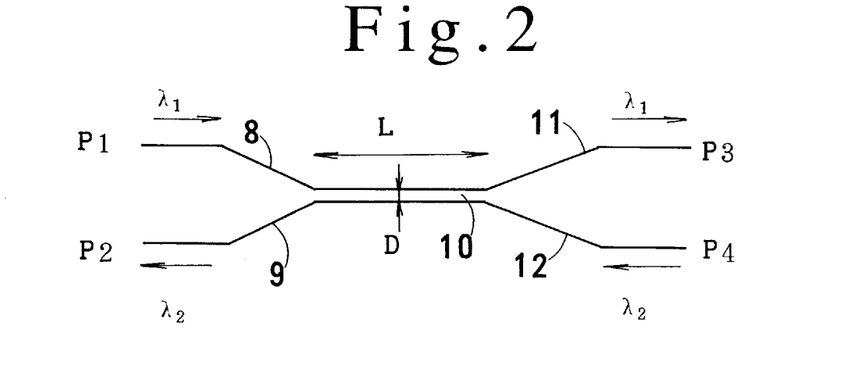
FIG. 2 is a schematic view of a WDM filter or an optical coupler making use of optical fibers or waveguides.

Various types of wavelength division multiplexers have been suggested. FIG. 2 indicates a WDM constructed by optical fibers or optical waveguides. Two optical paths 8 and 9 lie in a close relation at a part 10 for allowing the exchange of power. The distance D and the length L of the close portion 10 determine the modes of coupling. In the example, when $\lambda 1$ enters the path 8 (P1), the same wave appears in a path 11 (P3). Going into a path 12 (P4), $\lambda 2$ appears in a path 9 instead of the path 8 (P2). The coupling portion 10 gives wavelength selectivity to the device.

Figure 3:
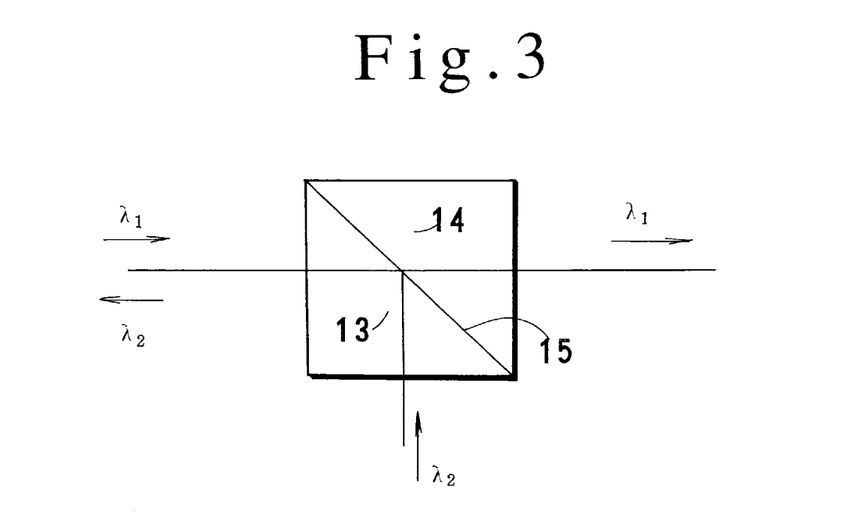
FIG. 3 is a schematic view of a WDM filter or an optical coupler in a rectangular column made by piling dielectric multilayers on a diagonal surface of a rectangular isosceles triangle column, gluing the triangle column to a partner column into a square column.

FIG. 3 shows another WDM which uses a multilayered mirror. The WDM consists of two rectangular isosceles triangle columns 13 and 14, and a dielectric multilayer mirror 15 formed on the slanting plate of the columns. The two columns are glued at the dielectric mirror 15 for making a square column. Selection of the refractive index and the thickness gives the dielectric multilayer the wavelength selectivity of allowing one wavelength $\lambda 1$ shooting at 45 degrees to the multilayer to pass through and of reflecting another wavelength $\lambda 2$ at a right angle. This dielectric layer type WDM can be the WDMs 2 and 4 in the optical communication system of FIG. 1. The WDM is sometimes called a wave-division-integration device. Fiber-type WDMs and glass block type WDMs are already on sale.

Figure 16:
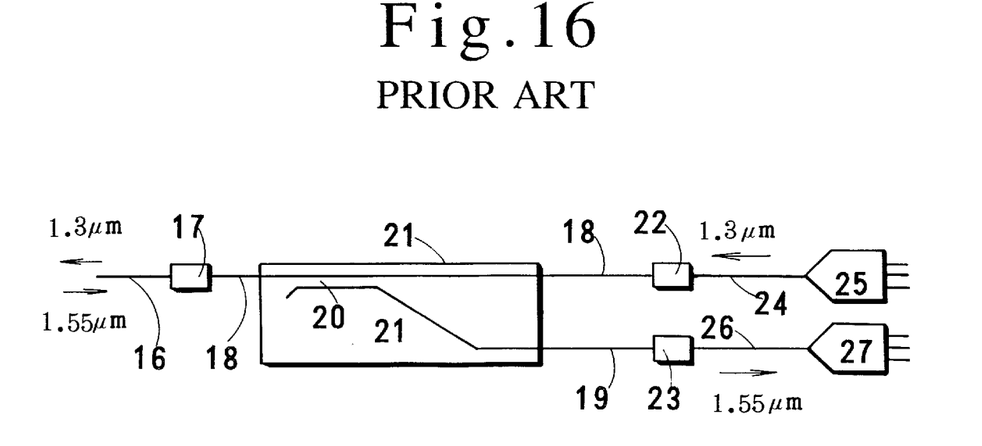
FIG. 16 is a schematic view of a prior-art LD/PD module.

An example of an LD/PD module on a subscriber side is explained by referring to FIG. 16. A single mode optical fiber 16 spreading from the central station is connected by an optical connector 17 to an optical fiber 18 of a subscriber (ONU) module. The ONU module has a fiber-type WDM 21 which couples the fiber 18 to a fiber 19 with wavelength selectivity. A contact portion 20 exchanges light power. An optical connector 22 couples the fiber 18 to an LD module 25 in the ONU. Another optical connector 23 joins the fiber 19 to a PD module 27.

The LD module 25 and the fiber 24 are part of an upward system. 1.3 $\mu$m light carries signals from the subscriber to the station through the upward system. The fiber 26 and the PD module 27 are part of a downward system. The station sends 1.55 μm light carrying signals to subscribers through the downward system. The PD module 27 converts the optical signals into electric signals. The LD module 25, a signal sending device, includes an electric circuit for amplifying and modulating the signals of telephones and facsimiles, and a laser diode (LD) for converting electric signals into optical ones. The PD module 27, a receiving device, contains a photodiode for converting optical signals from the station into electric signals, an amplification circuit for amplifying the optical signals and a demodulation circuit for restoring the television signals or telephone signals. The WDM 21 has a function for separating 1.55 μm light from 1.3 μm light. This example allots 1.3 μm light to the upward system and 1.55 μm light to the downward system.

This invention provides an improved LD/PD module for bidirectional multiwavelength optical communication. The LD/PD module signifies a device having an LD for producing optical signals, a PD for receiving optical signals and peripheral electric circuits for amplifying, modulating or demodulating signals. Related art is explained with regard to the parts.

[EXPLANATION OF KNOWN SEMICONDUCTOR LASER DIODE]

Figure 4:
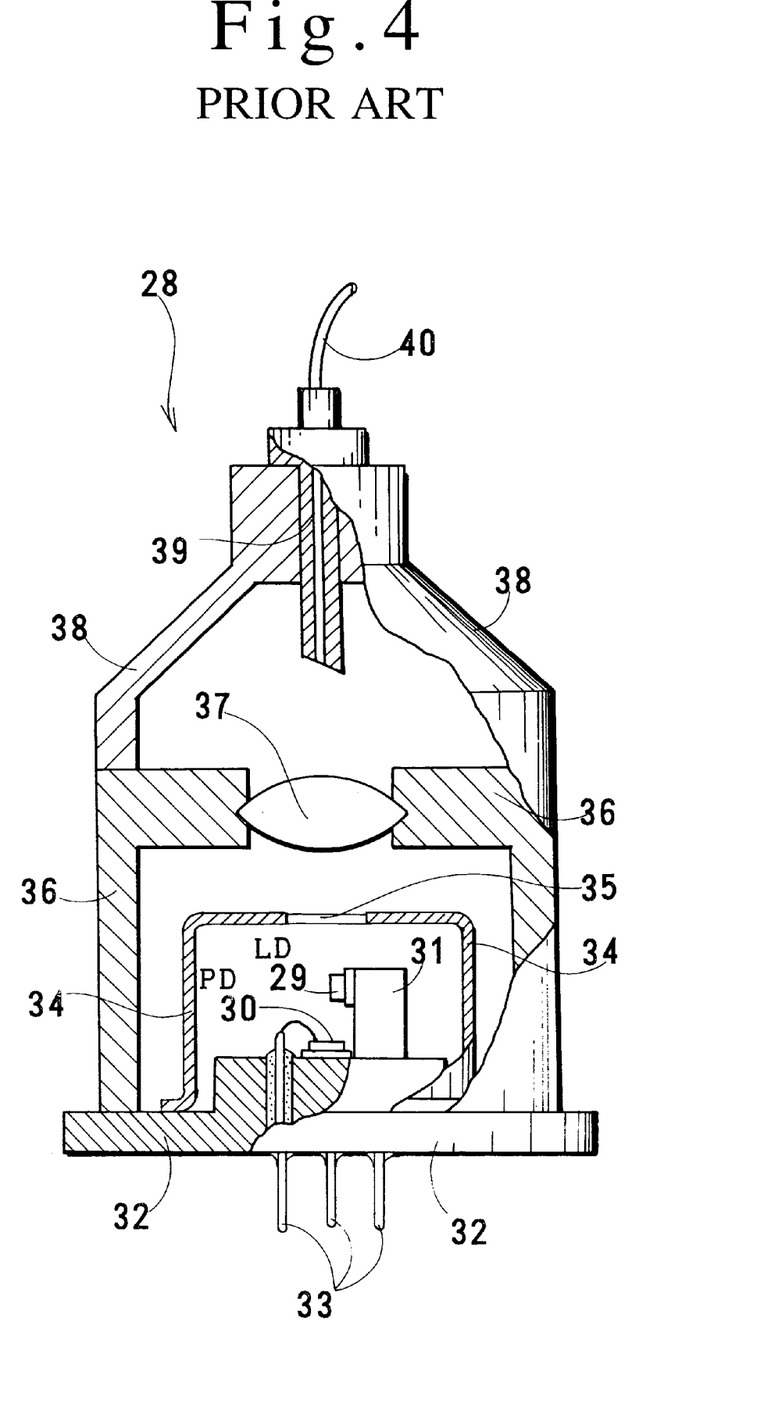
FIG. 4 is a vertically-sectioned view of a conventional LD module.

FIG. 4 shows a known laser diode device 28. The device 28 includes a semiconductor laser diode (LD) chip 29 and a monitoring photodiode (PD) chip 30. The laser diode chip 29 is vertically mounted on a side surface of a pole 31 on a header 32. The laser diode 29 emits light in a vertical direction. Photodiode chip 30 is mounted upon the top of the header 32 at a spot at which the laser shoots a backward light. A plurality of lead pins 33 implanted on the bottom of the header 32. A cap 34 covers the top surface of the header 32.

The cap 34 has a window 35 at the center. The light beams are emitted in both directions vertically from the laser diode 29. A lens 37 is fixed just above the window 35 by a lens holder 36. A conical housing 38 covers the top of the lens holder 36. A ferrule 39 pierces through a hole of the housing 38. The ferrule 39 holds an end of an optical fiber 40. The ends of the ferrule 39 and the fiber 40 are polished in a slanting plane of about eight degrees for impeding reflected light from going back into the laser. The holder 36 is aligned at an optimum spot to the header 32 by sliding the holder 36 and measuring the light power at the other end of the fiber 40. The housing 38 is also aligned to the lens holder 36 by the same manner. Wires connect the pads of the laser diode chip 29 and the photodiode chip 30 to the lead pins 33.

The lens 37 converges the light beams emitted from the laser 29 on the end of the fiber 40. The light beams go into the fiber 40. Since the laser is modulated by a driver circuit with an electric signal, the light carries the signal. The output of the laser diode is monitored by the monitoring photodiode 30. The material of the laser determines a wavelength between 1.3 μm and 1.55 μm of the light produced by the laser.

[EXPLANATION OF KNOWN PHOTODIODE DEVICE]

Figure 5:
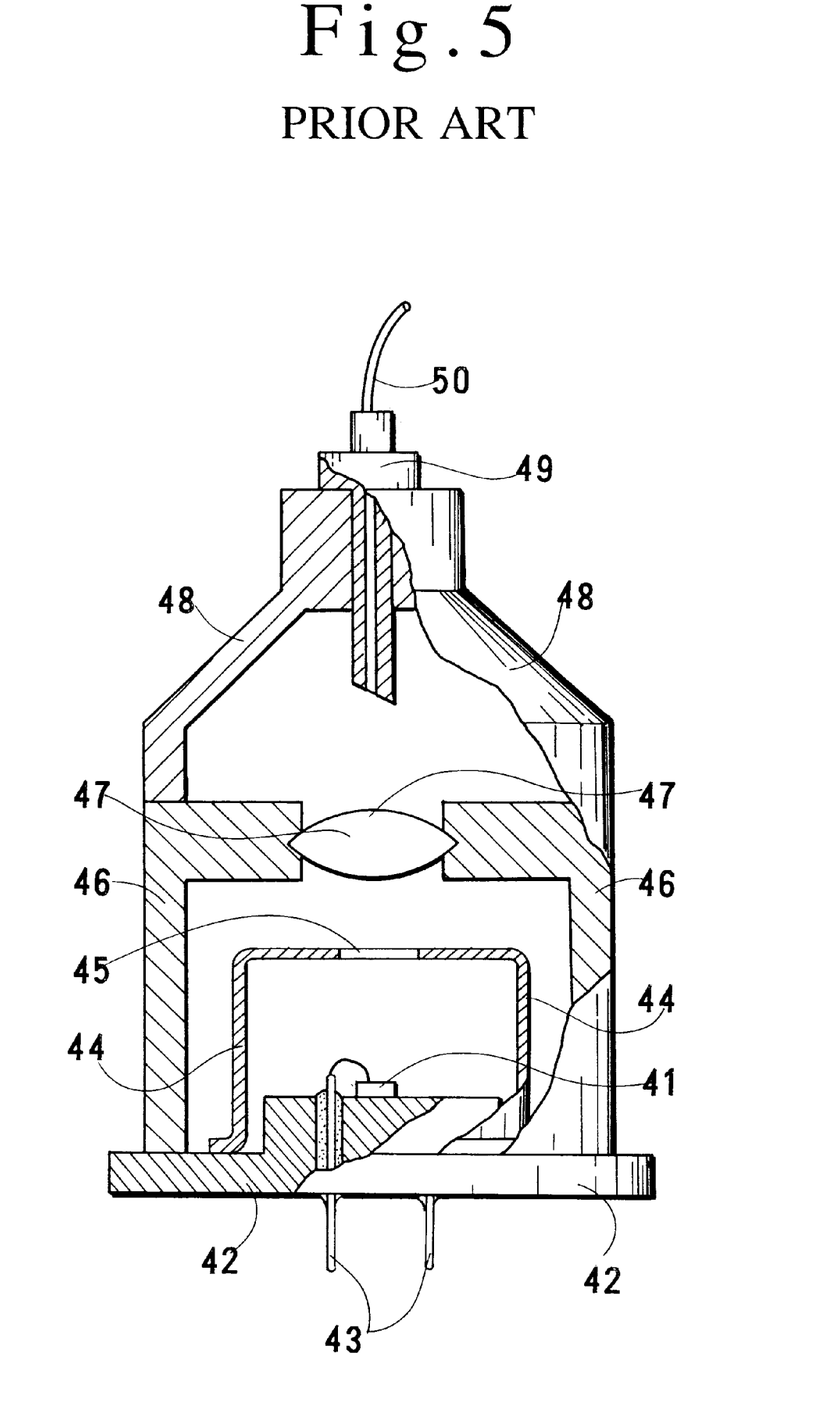
FIG. 5 is a vertically-sectioned view of a conventional PD module.

FIG. 5 shows a known photodiode device. The photodiode device has a header 42 as a package base. A photodiode chip 41 is die-bonded upon the header 42. Lead pins 43 project from the bottom of the header 42. A cap 44 protects the top surface of the header 42. An opening 45 is perforated at the center of the cap 44. A cylindrical lens holder 46 encircles the cap 44 upon the header 42. The lens holder 46 holds a lens 47 just above the photodiode chip 41.

The lens holder 46 has a conical housing 48 on the top. A ferrule 49 grips an end of an optical fiber 50. The ferrule 49 pierces a top hole of the housing 48 for fixing the fiber end to the housing 48. The ends of the ferrule 49 and the fiber 50 are slantingly polished for suppressing reflected light from returning back to the laser diode.

The holder 46 and the housing 48 are aligned at optimum spots by introducing light into the fiber from the farther end, measuring the light power by the PD 41 and maximizing the power input in the PD 41. The material of the light receiving layer of the PD 41 determines the range of wavelengths of the light detectable to the PD device. Silicon photodiodes are available for sensing visible light. However, silicon photodiodes are irrelevant for the present invention which aims at building an LD/PD module relying upon infrared light. Sensing of infrared light requires compound semiconductor photodiodes having InP as a substrate which has a relevant band gap and an InGaAs or an InGaAsP light receiving layer which has a narrow band gap for absorbing near infrared light.

Prior proposed LD/PD modules are not yet. Subscribers would be mostly households. Thus, the optical communication network should have a market as wide as telephones. However, consumers would not buy such an LD/PD module for optical communication unless the price of the module fell to a level as low as a telephone. For optical communication to become prevalent the subscriber sending-/receiving device must be inexpensive. The prior LD/PD apparatus proposed in FIG. 16 cannot be made as inexpensive as the price of a telephone, since the apparatus is only an assembly of a PD module, an LD module and a WDM module. The price is the sum of the modules.

A high price impedes the sending-/receiving devices from becoming prevalent among subscribers. Efforts have been to made to reduce the number of parts or diminishing the size of such devices for lowering their cost. Attempts for lowering the cost are now explained.

[A. Spatial separating beam type module (a receptacle containing a WDM, a PD and an LD)]

Figure 6:
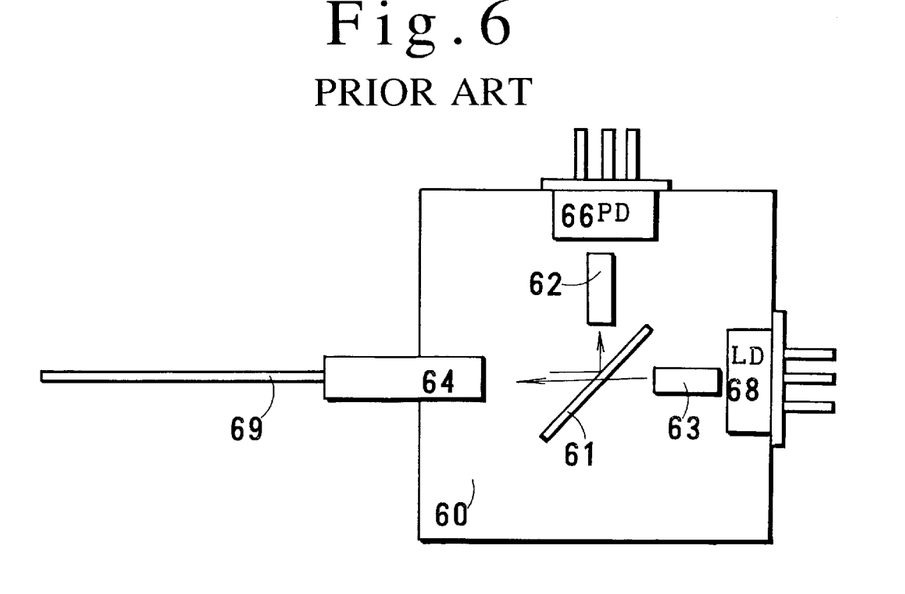
FIG. 6 is a horizontally-sectioned view of a prior-art receptacle-type multiwavelength LD/PD module.

FIG. 6 shows a candidate proposed by Masahiro Ogusu, Tazuko Tomioka and Sigeru Ohshima, "Receptacle Type Bi-directional WDM Module I", Electronics Society Conference of Japanese Electronics, Information and Communication, C-208, p208(1996). The module is built in a rectangular housing 60. A WDM filter 61 is centrally positioned in a 45 degree slanting direction to sides of the housing 60. Three drum lenses 62, 63 and 64 lie in radial directions at three sides of the housing 60. A photodiode 66 is mounted on one side in front of the drum lens 62. A laser diode 68 is fixed on another side in front of the lens 63. The lens 64 lies at the end of the fiber 69.

In practice, the module consists of two separable parts. One part having the fiber end can be detached from and attached to the other part (housing 60) containing the filter 61, the PD 66 and the LD 68. In the coupled state, an external fiber 69 is connected via the WDM 61 to the PD 66 and the LD 68. The lenses 64, 62 and 63 prevent the light emanating from the fiber 69 from diverging spatially in the receptacle. The LD 68 emits 1.3 μm light which penetrates the WDM filter 61 slantingly and goes into the fiber 69 for sending optical signals.

The incoming light propagating in the fiber 69 is 1.55 μm light which is reflected by the WDM filter 61. The reflected light is transmitted via the lens 62 into the PD 66. The module of FIG. 6 is smaller than the previously explained module of FIG. 16. However, the receptacle type module still contains two independent optoelectronic devices of the LD and the PD and the indispensable WDM filter in addition to three lenses for preventing light from dispersing spatially.

The alignment of parts is still as difficult as the module of FIG. 16. The cost is similar to the cost of FIG. 16.

[B. Y-bisecting wave guide type module (FIG. 7)]

Figure 7:
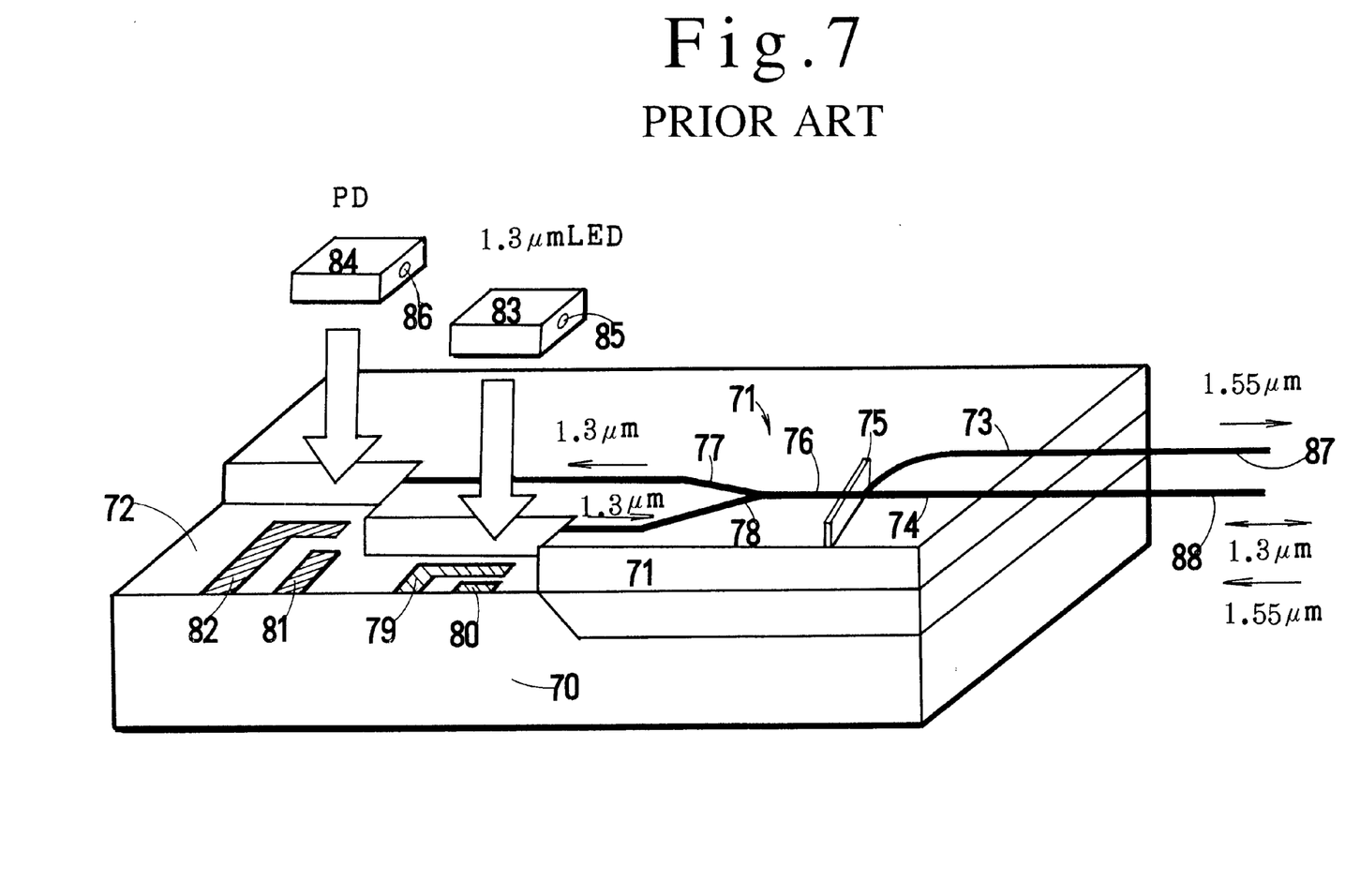
FIG. 7 is an oblique view of a prior-art Y-branch type multiwavelength LD/PD module.

FIG. 7 shows another LD/PD module proposed by Naoto Uchida, Yasufumi Yamada, Yoshinori Hibino, Yasuhiro Suzuki & Noboru Ishihara, "Low-Cost Hybrid WDM Module Consisting of a Spot-Size Converter Integrated Laser Diode and a Waveguide Photodiode on a PLC Platform for Access Network Systems", IEICE TRANS. ELECTRON., VOL.E80-C, NO.1, P88, January 1997. An insulating silicon substrate 70 is adopted as a base. A transparent quartz optical waveguide 71 is produced on the insulating silicon substrate 70. A corner of the waveguide 71 is cut into a step 72. Doping of impurity makes narrow Y-bisecting paths 73, 74, 76, 77 and 78 on the waveguide 71.

This example has two Y-branches. The first Y-branch has a WDM 75 at the cross point. The WDM 75 has wavelength selectivity that reflects 1.55 μm light but allows 1.3 μm light to pass through. Electrode patterns 79, 80, 81 and 82 are evaporated upon the step 72 of the waveguide. A light source 83 which has a bottom electrode is bonded on the electrode patterns 79 and 80. The light source 83 is either an LED or an LD for emitting 1.3 μm light from a point 85 on an end surface.

A PD chip 84 is bonded on the farther electrodes 81 and 82 on the step 72 for sensing 1.3 μm light. The light spreading in the optical fiber 88 contains both 1.3 μm light and 1.55 μm light. The light goes into the path 74 and attains to the WDM 75 which reflects 1.55 μm light to another fiber 87. 1.3 μm light continues along its way to the Y-branched paths 77 and 78. The half light reaching the LED 83 is of no use. The other half power shoots the PD 84 at a side point 86 for detecting the sent signals. The LED (or LD) makes sending signal light of 1.3 μm which propagates in the path 78, the WDM 75 and the path 74 and enters the fiber 88.

This example uses the WDM only for excluding 1.55 μm light. The biggest drawback of the proposed module is the difficulty of producing the planar Y-branched waveguide. Fabrication of curved Y-branch on a waveguide layer is far more difficult than the production of a straight path on a waveguide. In addition, the junction of fibers to the ends of the paths 73 and 74 is also a difficult task. Thus, the proposal gives us no means for solving the problem of making inexpensive LD/PD modules yet.

[C. Upward reflection WDM type LD/PD module (FIG. 8)]

Figure 8:
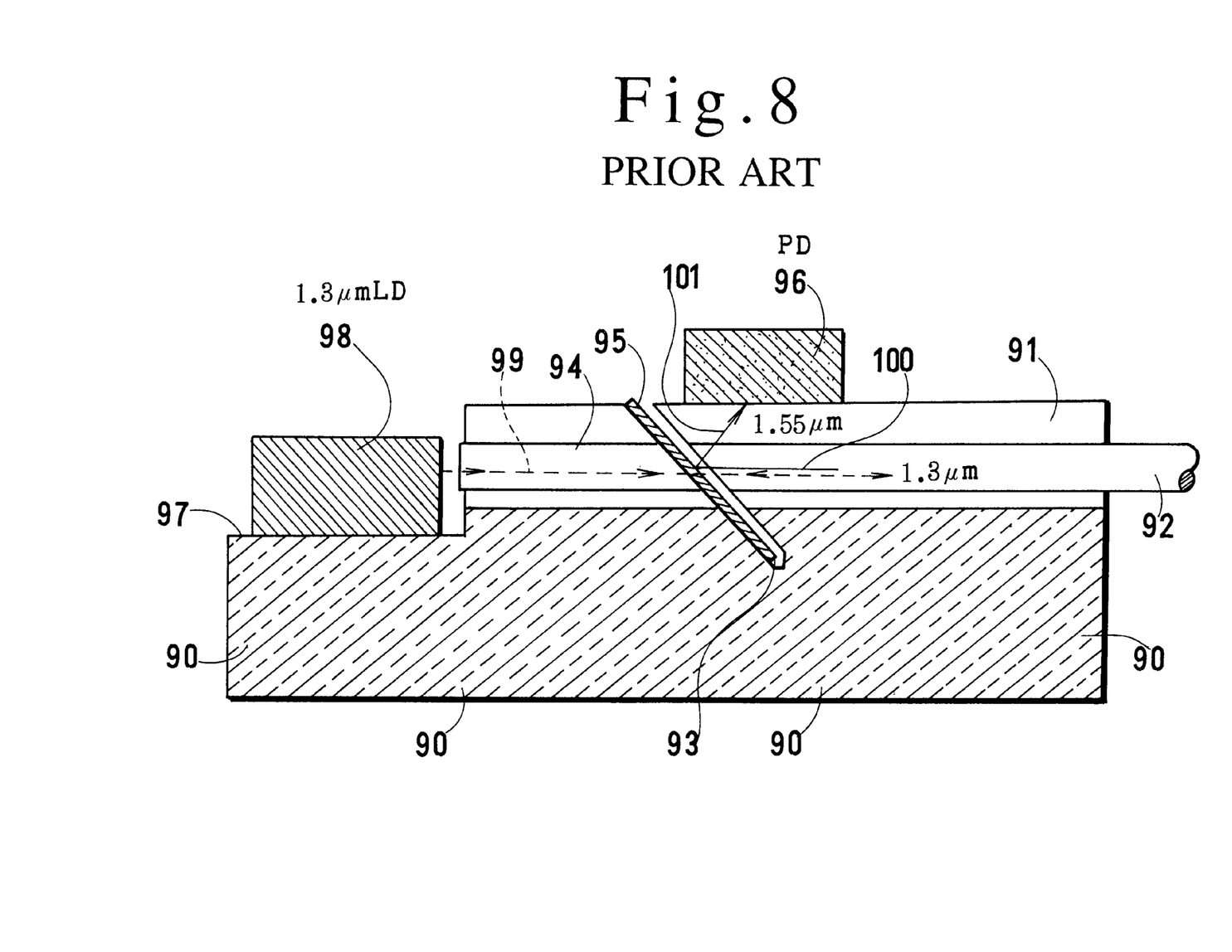
FIG. 8 is a sectional view of a prior-art LD/PD module including an upward slanting WDM which reflects incoming light upward.

FIG. 8 shows another LD/PD module proposed by Tomoaki Uno, Tohru Nishikawa, Masahiro Mitsuda, Genji Tohmon, Yasushi Matsui, "Hybridly integrated LD/PD module with passive-alignment technology", 1997 Conference of Electron, Information, Communication Society, C-3-89p198(1997). Mounting an LD and a PD on a common substrate allows the module to reduce cost and minimize size. In FIG. 8, a silicon substrate 90 provides a base to the module. Straight scribing makes a longitudinal V-groove 91 in the middle on the Si substrate 90. An end of an optical fiber 92 is inserted and fixed in the V-groove 91. Slanting cutting makes a deep slanting notch 93 midway across the fiber 92 and the V-groove 91 into the Si substrate 90. A fiber end 94 is cut and separated from the fiber 92 by the notch 93. The slanting notch 93 holds a WDM filter 95 in it. A PD 96 is mounted before the slanting WDM filter 95 above the V-groove 91 on the top of the Si substrate 90. A step part 97 is made by cutting the back end of the Si substrate 90. An LD chip 98 lies upon the step part 97. The LD 98 emits 1.3 μm light 99 for sending signals. The sending light 99 propagates in the fiber 92 and the WDM 95 to the station (not shown). The receiving light of 1.55 μm 100 running in the fiber 92 is reflected by the WDM 95 to be light 101 and sensed by the PD 96. The light path turns upward at the branch.

The module of FIG. 8 seems to have a simple structure. However, it is difficult to bury a fiber into a V-groove, and to align an LD and a PD to the fiber by sliding the LD and the PD and monitoring the light power sensed by the PD. A single-mode fiber has a 10 μm core diameter and a 125 μm cladding diameter. Insertion of the WDM filter 95 requires the notch to cut the thick cladding. Thus, two fibers are equivalently separated by (125 μm+WDM) at the notch 93. The wide separation increases the reflection loss between the fibers 94 and 92. The LD light leaks at the gap.

SUMMARY OF THE INVENTION

The LD/PD module of the present invention comprises a platform, a light guide straight formed at a center of the platform for guiding light, a plurality of guide pins fixed on the platform for connecting the platform to an optical connector (not shown in FIG. 9), a filter laid on the light guide for reflecting a portion of the light and for allowing another portion of the light to pass through, a photodiode mounted upon the platform for detecting the reflected light the by the filter, a light source (LD or LED) mounted upon the platform at the back of the light guide for generating sending light carrying signals. The end of the light guide faces an optical fiber in a good alignment in an optical connector by inserting the guide pins into sockets of the optical connector. Received light having passed the fiber in the connector enters the light guide, reflects on the filter and makes its way to the PD which converts light signals to electric signals. Sending light from the light source (LD or LED) penetrates the filter, is transmitted through the light guide and enters the fiber in the optical connector.

The light guide is a straight waveguide produced by enhancing partially refractive index by doping impurity to a linear part in a transparent material of the platform. The light guide is not a fiber glued on the platform but a waveguide made in the platform by impurity doping. The platform is transparent at least at the top. The waveguide on the platform can be made by transparent inorganic glass material or transparent resins. Quartz is the best material for the waveguide.

This invention is also applicable to a simpler LD/PD module which uses a single wavelength λ both for sending signals and for receiving signals. In the mono-wavelength system, the filter reflects a part of λ light and allows the other part of λ light to pass at a definite rate. In addition to the mono-wavelength system, this invention is also applicable to a two-wavelength system which sends λ1 light and receives λ2 light. In such a system, the filter has two roles of reflecting all λ1 and allowing all λ2 to pass. In this case, the filter is a WDM filter.

The filter can be produced by piling a plurality of dielectric films of different refractive indexes in turn for providing a desired ratio of reflection to penetration for a definite range of wavelengths. For example, a filter with wavelength selectivity or a partial reflection rate can be made by piling a plurality of dielectric films of different thicknesses and different refractive indexes on a glass substrate in turn or by piling a plurality of dielectric films in layers on a transparent plastic substrate.

The LD/PD module has, for example, an InGaAs or an InGaAsP photodiode having an InP substrate and an InGaAs or InGaAsP light receiving layer. Signal light is near infrared light, e.g., of 1.3 μm or 1.55 μm. The module has an LD of, e.g., an InGaAsP active layer.

Otherwise, a Si—PD can be used as a photodiode. In the case of the Si—PD, signal light should be visible light of a wavelength between 0.7 μm and 0.8 μm. InGaAsP lasers would be replaced by GaAlAs lasers as light sources. Both top surface incidence type PDs and bottom surface incidence type PDs can be used as photodetectors. Additional mounting of a pre-amplifier which amplifies a photocurrent of the PD raises sensitivity, enabling the PD to detect weak signals and suppressing external noise.

The sizes of the guide pin, diameter, length, or spacing, should be determined for enabling the pins to fit with the optical connector, which is, for example, a MT connector or a mini connector.

This invention is based upon a different concept from prior LD/PD modules. All the conventional modules employ a common concept of a module having a fiber in itself. Prior modules have communicated with other optical devices thorough the fiber. In contrast to prior fiber-housing modules, this invention advocates a fiberless LD/PD module which can attach to or detach from an optical connector directly. This invention joins the light guide to the fiber in a connector by coupling the module to the connector with the guide pins and the holes. Then, this module need not include a fiber in itself. Since there is no fiber, this module requires no means for fixing a fiber or for adjusting a fiber to other optical parts.

Advantages of the present invention will now be explained.

(1) The first advantage of the present invention is facile attachment or detachment to/from an optical connector. In particular, the embodiment of FIG. 9 has guide pins directly on the Si platform for attaching to or detaching from an MT connector or a mini-MT connector which makes it useful. For example, the module can be formed by digging V-grooves on the platform, inserting guide pins into the V-grooves and fixing the guide pins in the V-grooves. Thus, a first feature of the invention is its ability to attach and detach from ready-made optical connectors, e.g., MT connectors or mini-MT connectors.

(2) A second feature of the invention is a straight light guide produced on the Si platform and a WDM filter interposed on the light guide. It is easy to make a simple, straight light guide. This invention dispenses with a WDM coupler (FIG. 2 or FIG. 7) or a filter by surface wave guides. Optical circuits based upon a surface wave guide are called PLCs (Planar Lightwave Circuits). The WDM filter in FIG. 2 and the LED/PD module in FIG. 7 are produced by PLCs including complex components, e.g., Y-branches, confluences (coupling parts) and curves. The function of separating or integrating light waves and the function of selecting waves by wavelengths requires such complex components. But it is difficult to produce light waveguides including curves, Y-branches or confluences. This invention makes a light guide by raising the refractive index of the platform locally. But the light guide is a straight line. This invention includes neither branch, curve nor confluence of waveguides. The light guide this invention uses is not a waveguide but a simple light guide. The light guide is a single-mode guide which can easily be fabricated with a high yield.

The PLC (Planar Lightwave Circuit) technology aims at high-performance and sophistication by allotting WDMs, branches or confluences to the PLCs in general. This invention does not take such a complicated way but adopts a simple, straight light guide on a platform, which alleviates the difficulty of fabrication. If an optical fiber were to be glued to an end of a light guide like FIG. 7, it would require a difficult adjustment and would invite an error of the position of the fiber. This invention which does not glue an optical fiber to the light guide is immune from the difficult adjustment.

Figure 10:
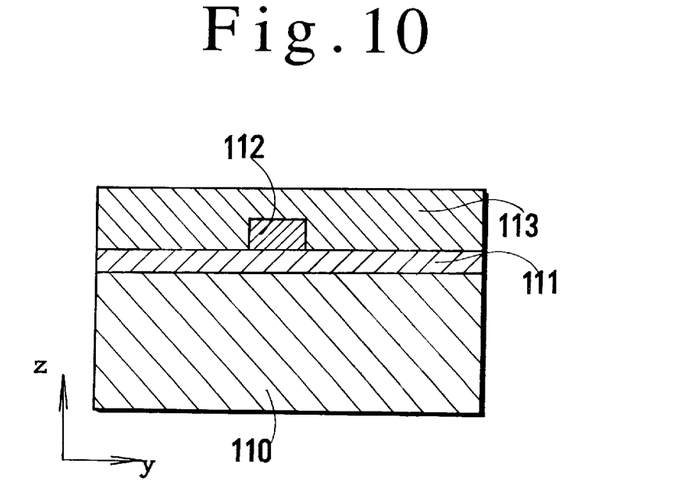
FIG. 10 is a sectional view of the platform having a light guide on the surface.

FIG. 10 shows a section of a light guide of the module. The longitudinal direction of the light guide is assigned to x-direction. This is a yz-section of the Si platform intersecting the light guide at right angles. The platform is a Si substrate 110. A $SiO_2$ buffer layer 111 is made upon the Si substrate 110 by a flame deposition method or a sputtering method. A germanium-doped high refractive index $SiO_2$ layer 112 is produced overall upon the $SiO_2$ buffer layer 111. Sides of the Ge-doped high refractive index $SiO_2$ layer are removed by photo etching with a mask having a pattern of central stripe. A central linear stripe part 112 of the Ge-dopes $SiO_2$ survives. A low-refractive index $SiO_2$ layer 113 is formed upon the stripe 112 and the buffer layer 111 by flame deposition or sputtering. Thus a light guide is produced. The Ge-doped high refractive index $SiO_2$ stripe 112 is assigned to a core. The peripheral low-refractive index $SiO_2$ layer 113 is a cladding layer. It is feasible to make such a simple light guide, since the light guide includes neither curve, confluence nor branch.

(3) A third feature of the invention is its low coupling loss. The module of the present invention can be coupled to an optical connector with high accuracy, since a single Si platform contains the light guide and the V-grooves for the guide pins. The precise assemblage ensures a low coupling loss. Matured mask alignment technology and the sophisticated lithography enable the light guide to interpose correctly at the middle of the guide pins. Since the partner optical connector has been made to have an end of the fiber at a middle point between the pin-holes, the end of the fiber of the connector faces exactly the end of the light guide of the module in the coupled state.

(4) A fourth feature of the invention is the smallness of the module. The WDM filter is made from an assembly of thin film dielectric layers. Piling dielectric films on a thin glass or a thin plastic substrate makes a small WDM filter unlike the bulky glass block WDM of FIG. 3. Unlike the WDM of FIG. 2 which selects wavelengths along a coupled path and divides different wavelengths in a plane, the WDM of the invention divides the wavelengths slanting to the plane. The embodiment of FIG. 9 bends the receiving light at 90 degrees by the WDM. The incidence direction and the refraction direction are not in parallel to the WDM. The bent receiving light advances in the vertical path 117, shoots the slanting plane at 45 degrees, turns upward and goes into the bottom of the PD 137.

(5) The fifth feature is the pre-amplifier mounted on the same platform. The existence of the amplifier in the same package raises the sensitivity as the receiving set. If the amplifier is positioned out of the package, external noise is liable to invade in the module via wires or lead pins. This invention gives the module high sensitivity and strong resistance against external noise by amplifying the photocurrent of the PD by the pre-amplifier within the module.

Figure 12:
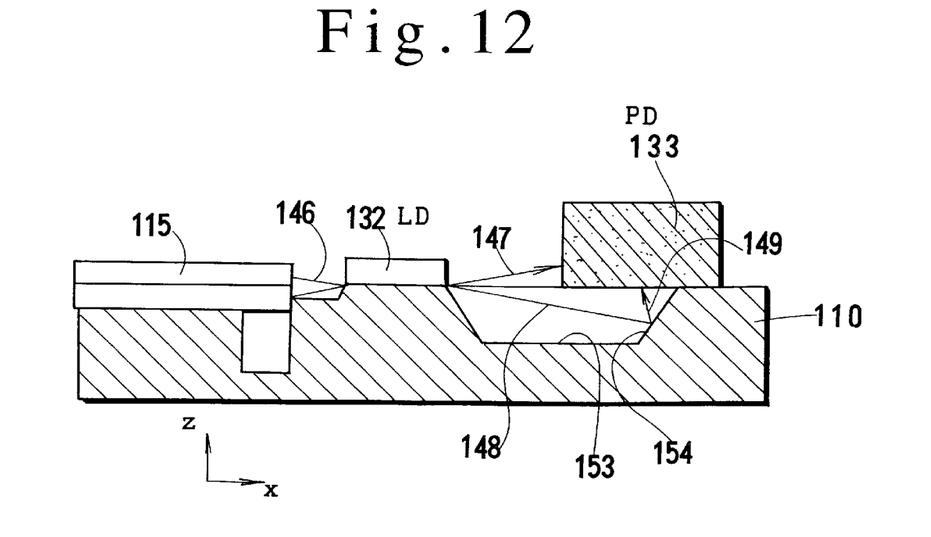
FIG. 12 is a zx-sectioned view of the embodiment having a PD monitoring the light power of the LD.

(6) The signal sending port can be built only with an LD. Preferably, an additional monitoring PD is included in the sending port. The monitoring PD is mounted behind the LD for stabilizing the output power of the LD in the example. In FIG. 12, the light guide 115 is coupled in butting joint to the LD 132, which dispenses with a lens. The monitoring PD 133 is a bottom-incidence type PD in FIG. 12. The slanting plane 154 allows the beams from the light guide to emerge from the groove up to the PD. The set of the V-groove and the bottom-incidence type PD simplifies the light paths on the platform.

Figure 13:
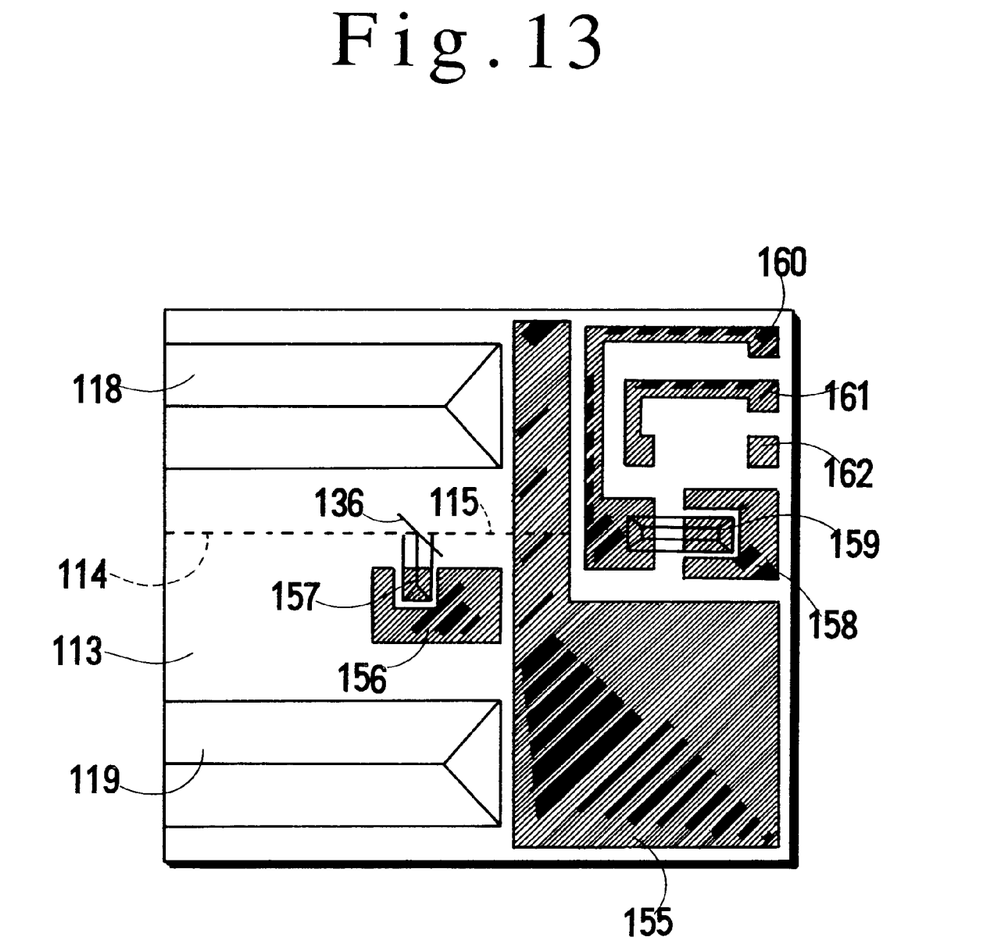
FIG. 13 is a plan view of another embodiment platform having metallized patterns and V-grooves.

(7) A further feature of the invention is its simple wiring. This module produces Au-metallized patterns on the Si platform for facilitating the connections of the LD, the PDs and the amplifier via lead pins to external circuits. FIG. 13 shows an example of metallized patterns on the platform. Another set of patterns is also available other than the examples of FIG. 9 and FIG. 13.

Figures 14A, 14B:
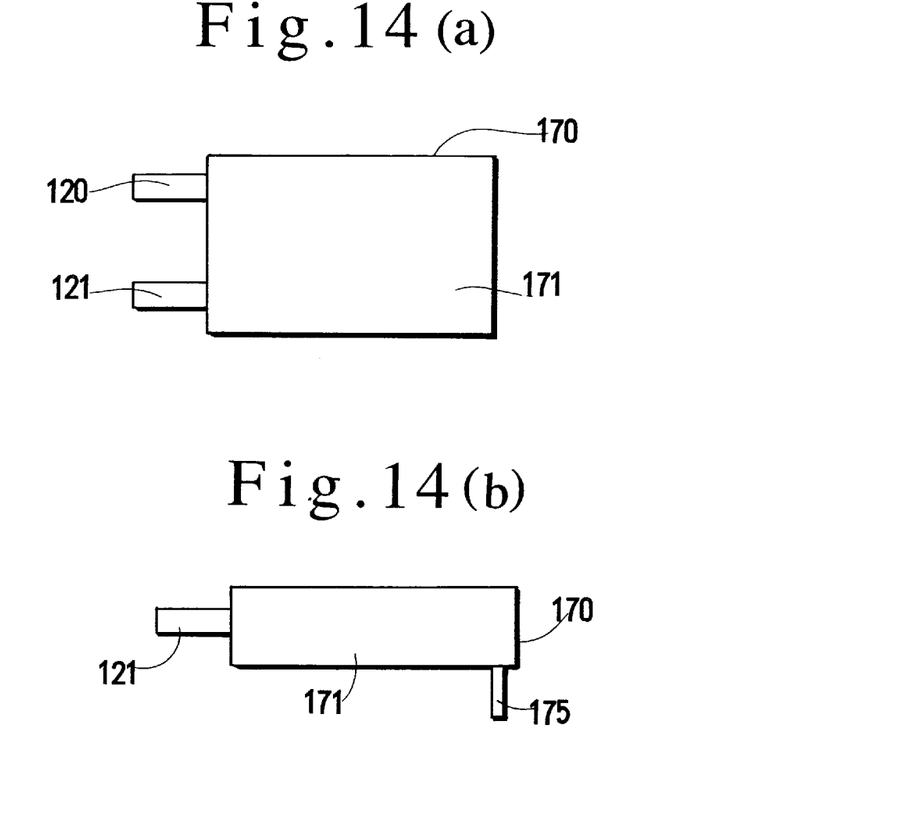
FIG. 14(a) is a plan view of the embodiment LD/PD module sealed in a package.
FIG. 14(b) is a front view of the embodiment LD/PD module sealed in a package.
Figure 15:
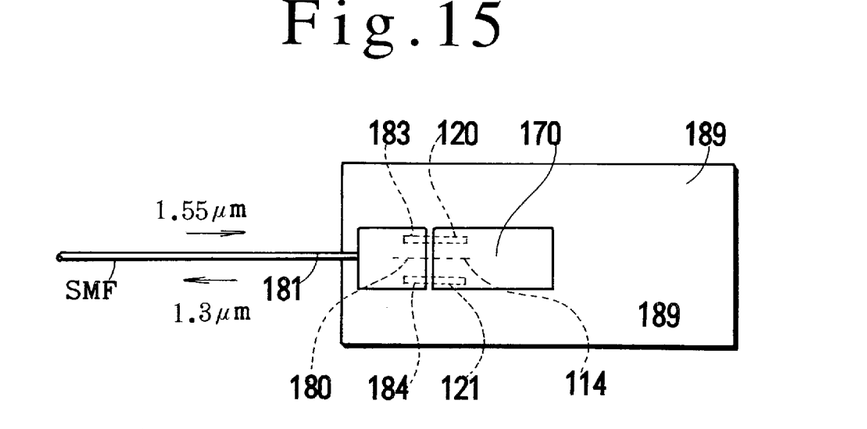
FIG. 15 is a plan view of a print circuit board having the LD/PD module to which an optical connector is attached.

(8) Another feature of the invention is a compact appearance without a tangling tail of a fiber. FIG. 14 denotes the appearance of the module. The module has no fiber tail but has only the guide pins and the lead pins. FIG. 15 shows the coupled state of the module and the MT connector having a single-mode fiber communicating to the central station. Since an optical connector can be irreversibly coupled to the module, the module itself need not contain a fiber.

DETAILED DESCRIPTION OF THE PREFERRED EMBODIMENTS

Figure 9:
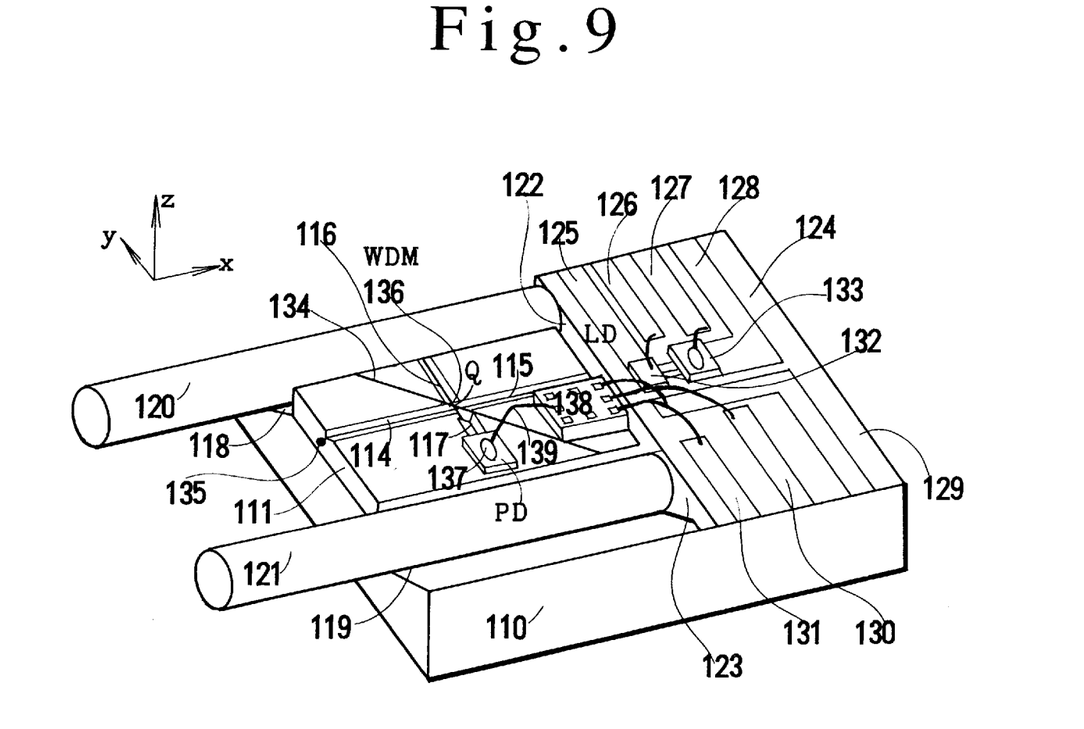
FIG. 9 is an oblique view of an embodiment LD/PD module of the present invention.

FIG. 9 shows an embodiment of the present invention. A Si substrate having a $SiO_2$ top layer is used as a platform 110, because photolithography and other technology are matured for Si wafers and Si devices. As alternatives, a ceramic plate, a plastic plate or a metal plate could be used for platform 110. The silicon platform 110 has light guides 114 and 115 (in x-direction) on the surface in the middle. The light guides 114 and 115 are produced by enhancing the refractive index of the $SiO_2$ in x-direction partially.

FIG. 10 shows a section of the light guide on the silicon platform 110. Oxidization or sputtering can be used to provide a $SiO_2$ buffer layer 111 on the silicon platform 110. Sputtering or CVD produces further a Ge-doped higher refractive index $SiO_2$ layer 112 overall on the $SiO_2$ buffer layer 111. Photoetching with a mask removes side parts of the Ge-doped $SiO_2$ 112 except a middle stripe. A Ge-doped $SiO_2$ middle stripe remains on the buffer layer 111. Lower-refractive index $SiO_2$ cladding layer 113 is deposited on the Ge-doped higher refractive index layer 112 and the $SiO_2$ buffer layer 111 by sputtering or CVD. The higher refractive index stripe 112 is the light guides 114 and 115. The light guides guide light because of their higher refractive index than the neighboring $SiO_2$ cladding layer 113.

Vertical paths 116 and 117 are made in y-direction in the vicinity of the middle point of the light guides 114 and 115. The vertical paths 116 and 117 also conduct light. The vertical paths 116 and 117 can be either vacant grooves or Ge-dope light guides. The groove vertical paths allow light to disperse slightly, since the light propagates in space. The light guide vertical paths suppress light from dispersing.

Photoetching makes two longitudinal V-grooves 118 and 119 in x-direction on the platform 110. The V-grooves 118 and 119 sustain guide pins 120 and 121. The guide pins 120 and 121 are metal bars, plastic bars or ceramic bars. An adhesive fixes the guide pins 120 and 121 on the V-grooves 118 and 119. The number, the length, the diameter or the spacing of the guide pins should be determined for fitting the holes of a partner optical connector. When the partner optical connector has three or four holes, the platform should have three or four guide pins in accordance with the holes.

Relative spacings between the optical guide 114 and the guide pins 120 and 121 are an important factor. When the holes of the optical connector receive the guide pins 120 and 121, the optical fiber of the connector should face just on the optical guide 114 in the longitudinal direction. Preferably, the guide pins are parallel with the optical guides. Non-parallel guide pins, however, are also allowable, if the fiber coincides with the optical guide 114 in the joined state.

In the example, the V-grooves 118 and 119 have slanting ends 122 and 123. The platform 110 has a rear plateau 124, The plateau 124 has a plurality of printed electrode patterns 125, . . . , 131 extending in the y-direction. These electrodes connect a laser diode (LD) 132 emitting light and a photodiode (PD) 133 to external circuits. The LD 132 is mounted on the rear plateau 124 at a point of an extension of the light guide 115. The LD 132 is settled at the position for guiding the light emitted from the LD 132 to the light guide 115. A bottom electrode of the LD 132 is bonded upon the electrode pattern 125. A top electrode of the LD 132 is connected to another electrode pattern 126 by a wire. The electrode patterns 125 and 126 carry an electric current for driving the LD 132.

The PD 133 is bonded on the electrode pattern 128 at the back of the LD 132. The PD 133 is not a signal receiving PD but a monitoring PD of sensing the output of the LD 132. A top electrode of the PD 133 is joined to the electrode pattern 127 by a wire. If the heights of the LD 132 and the PD 133 are different, a structure of FIG. 12 is contrived for guiding the rear emitted beams into the PD 133.

In FIG. 12, the LD 132 is mounted upside down on the platform 110. Namely, the luminous part touches the platform 110. Front beams 146 emitted from the front end of the LD 132 go into an end of the light guide 115. Rear beams 147 emitted from the rear end of the LD 132 shoot a side of the PD 133. The rear illuminated type PD 133 is insensitive to the side beams. A cavity 153 is perforated between the LD 132 and the PD 133. A slanting plane 154 of the cavity 153 reflects beams 148 emitted from the LD 132. Reflected beams 149 goes up to the bottom of the PD 133. The PD 133 senses the light beams going upward from the bottom for stabilizing the power of the laser 132.

An oblique groove 134 crosses the light guides 114 and 115 and the vertical paths 116 and 117 at a bisecting angle at the crossing point Q in the $SiO_2$ cladding layer 113. $\Phi$ is the cross angle between the light guides and the vertical paths. The oblique groove 134 inclines at an angle $\Phi/2$ both to the vertical paths and the light guides. Any angle other than 90 degrees is also allowable. An example of $\Phi=90$ degrees is explained hereafter. In the example, the oblique groove 134 meets with the light guides 114 and 115 at 45 degrees. However, it is possible to position the filter at the middle point in the light guide at 30 degrees to the light guide.

A filter 136 is inserted into the oblique groove 134 at the cross point Q. The filter 136 has a transparent substrate of glass or plastics and dielectric multilayers piled on the substrate. The filter 136 obtains the wavelength selectivity of reflection or penetration by piling two kinds of dielectric layers of different thicknesses and refractive indexes.

When the optical communication system employs only one common wavelength $\lambda$ for both the sending signal and the receiving signal, time is shared for sending signals and for receiving signals. This time-sharing system is called a ping-pong transmission. For example, the sending signal rides on 1.3 $\mu$m light and the receiving signal rides also on 1.3 $\mu$m light. In the ping-pong transmission, the filter 136 should have the role of allowing a part of the wavelength light to pass and of reflecting the other part of the same wavelength light at a definite rate. For example, the filter 136 should have a function of reflecting and leading the common wavelength light of a incidence angle of 45 degrees with a ratio of penetration:reflection=1:1.

Allotment of different wavelengths of sending signals and receiving signals gives simultaneous bidirectional transmission to the communication system. $\lambda 2$ is the wavelength of sending signals. $\lambda 1$ is the wavelength of receiving signals. In this case, the filter 136 should have 100% transparence to the 45 degree incidence sending light $\lambda 2$ and should have 100% reflection to the 45 degree incidence receiving light $\lambda 1$. The simultaneous bidirectional transmission requires such a wavelength-selective filter. Namely, the filter 136 should be a WDM filter. However, when the light is reflected at 45 degrees, the amount of light entering the PD becomes a little smaller due to the difference of reflectivity according to the direction of polarization. This is a defect for the WDM filter positioned inclining at 45 degrees to the light guide. In such case, it is suitable to let the light reflect at 30 degrees by arranging a WDM filter at 30 degrees to the light guide. A PD 137 is mounted on an end of the vertical path 117. This is a PD for receiving signals, which has a role different from the monitoring PD 133. The PD 137 is connected to an amplifier 138 by a wire 139.

Figure 11:
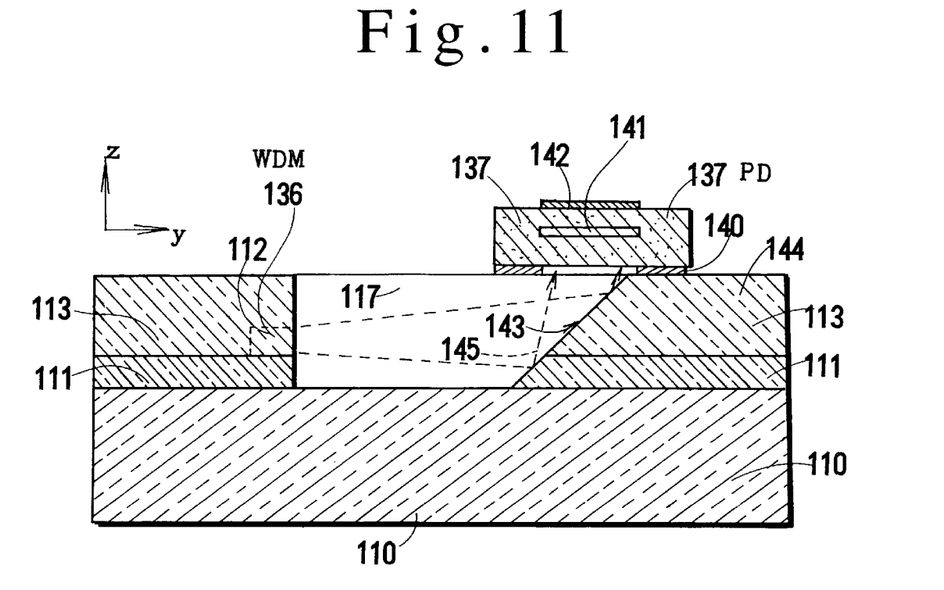
FIG. 11 is a zy-sectioned view of the embodiment having a bottom-incidence type PD for receiving signal light emitted from the light guide and reflected by the slanting plane in a groove.

An inlet and outlet of signal light is the front end 135 of the light guide 114. The signal light from the central station goes into the light guide 114 at the inlet/outlet point 135. The incoming light is reflected by the filter 136 to the vertical path 117 and goes into the PD 137 thorough a bottom opening. In this case, the beam height in the vertical path 117 is different from the PD 137. The difference of height requires a contrivance as shown in FIG. 11. FIG. 11 is a section taken along yz-plane at the WDM 136. Incoming light 145 reflected by the WDM 136 gets ahead in the vertical path 117, shoots a slanting plane 143, and enters the bottom surface incidence type PD 137. The PD 137 has a light receiving region 141 near the top surface and a p-electrode 142 on the top. A ring n-electrode 140 is formed on the bottom. The PD 137 is bonded on a metallized pattern 144 of the platform 110.

The function of the LD/PD module is clarified. Inserting the guide pins 120 and 121 into the holes of a partner optical connector joins the module to the optical connector. The optical fiber in the connector just faces the light guide 114 of the module. Propagating in an optical fiber from the central station, the signal light transfers from the connector to the light guide 114, turns to the right at the WDM 136, makes its way along the vertical path 117 to the PD 137 and produces a photocurrent in the PD 137. On the contrary, the sending signal light is produced by the LD 132, goes into the light guide 115, passes the WDM 136, progresses in the light guide 114 and is infused into the fiber of the connector. This LD/PD module has no pig tail of a fiber. The LD/PD module can be easily connected to an optical connector by inserting the guide pins into the holes.

FIG. 14 shows a appearance of an assembled LD/PD module 170 which has a case 171 and the platform sealed in the case 171. The guide pins 120 and 121 project from the case 171. The bottom end of the case 171 has a plurality of downward lead pins 175. The lead pins 175 are connected to inner electrode patterns for giving electric power to the LD, the PD, the monitoring PD, sending signals to the LD, and extracting receiving signal from the PD and power signal from the monitoring PD.

FIG. 15 shows the LD/PD module installed on a printed circuit board 189 for information processing and coupled with a optical connector 180. The printed circuit board 189 includes electric circuits for converting signals to be sent into a form congruous to sending, for amplifying received signals and for reproducing signals. Besides the circuits, the printed circuit board 189 has the LD/PD module 170 soldered on it. The optical connector 180 is, e.g., an MT (miniature) connector or a mini-MT(mini-miniature) connector. A connector 180 has a pair of holes 183 and 184 which correspond to the guide pins 120 and 121 of the module 170. The end of the optical fiber 181 is exactly interposed at the middle point between the holes 183 and 184 in the connector 180. Insertion of the guide pins 120 and 121 into the holes 183 and 184 brings the fiber 181 into contact with the light guide 114 of the module 170. The downward signal light of 1.55 $\mu$m from the central station transfers to the light guide 114, turns to the right at the WDM filter 136, enters the PD 137 and makes a photocurrent in proportion to the light power.

The sending signal light emitted from the LD 132 makes its way in the light guides 115 and 114, transfers into the fiber 181 in the connector 180, propagates in the fiber and arrives at the central station. Although this LD/PD module has no optical fiber in itself, it is facile to attach or detach the LD/PD module to or from the optical connector.

FIG. 13 is a plan view of a platform having another disposition of metallized patterns. Dotted line denotes the light guides 114 and 115. A metallized pattern 156 is a base pad for mounting a PD for signal reception. A bottom n-electrode of the PD is bonded upon the pattern 156. A metallized pattern 157 in the vertical path (a V-groove in the example) enhances the reflection of the slanting plane for reinforcing the power of signal light entering the PD. A wide metallized pattern 155 is a base for soldering a bottom of a pre-amplifier. A top p-electrode of the PD is connected to an input pad of the pre-amplifier. An LD will be die-bonded upon an end of a metallized pattern 160. A top stripe electrode of the LD is connected to a metallized pattern 161 by a wire. A monitoring PD is mounted upon a pattern 158. A metallized pattern 159 heightens the reflection of the slanting plan 154. A top p-electrode of the monitoring PD is connected to a pattern 162 a wire.

What is claimed is:

1. An LD/PD module comprising:

a planar platform;

a filter intersecting a light guide said filter constructed to partially transmit and partially reflect light which impinges thereon;

a photodiode (PD) constructed and arranged to defect power of lighter reflected by the filter;

a laser diode (LD) positioned at an extension of the light guide, said laser diode constructed and arranged to produce and introduce a signal light into the light guide;

the light guide being non-Y-branched, straight light guide formed in the platform in a direct line from the extension of the light guide toward an edge of the platform; and a plurality of guide pins fixed to the platform to attach the platform to an optical connector having corresponding holes.

2. An LD/PD module as claimed in claim 1, wherein the light guide is a straight line waveguide formed on the platform by doping it with an impurity which enhances its refractive index, and wherein the filter is positioned at nearly 45 degrees to the light guide and is adapted to partially transmit and partially reflect light of a single wavelength.

3. An LD/PD module as claimed in claim 1, wherein the light guide is a straight line waveguide formed on the platform by doping it with an impurity which enhances its refractive index and the filter is positioned at nearly 30 degrees to the light guide and is adapted to partially transmit and partially reflect light of a single wavelength.

4. An LD/PD module as claimed in claim 1, wherein the light guide is a straight line waveguide formed on the platform by doping it with an impurity which enhances its refractive index and the filter is positioned at nearly 45 degrees to the light guide and is a WDM filter which is adapted to divide light of two different wavelengths by reflecting one wavelength light at nearly 100% and allowing the other wavelength light to pass at nearly 100%.

5. An LD/PD module as claimed in claim 1, wherein the light guide is a straight line waveguide formed on the platform by doping it with an impurity which enhances its refractive index and the filter is positioned at nearly 30 degrees to the light guide, is a WDM filter which is adapted to divide light of two different wavelengths by reflecting one wavelength light at nearly 100% and allowing the other wavelength light to pass at nearly 100%.

6. An LD/PD module as claimed in claim 1, wherein the light guide is an $SiO_2$ waveguide which is produced by doping $SiO_2$ with an impurity for enhancing the refractive index thereof.

7. An LD/PD module as claimed in claim 1, wherein the light guide is a transparent plastic waveguide.

8. An LD/PD module as claimed in claim 1, wherein the filter includes a transparent plastic substrate and dielectric multilayers piled on the transparent plastic substrate.

9. An LD/PD module as claimed in claim 1, wherein the filter includes a transparent glass substrate and dielectric multilayers piled on the transparent glass substrate.

10. An LD/PD module as claimed in claim 1, wherein the photodiode is an Si photodiode and the laser is a GaAlAs laser.

11. An LD/PD module as claimed in claim 1, wherein the photodiode is an InGaAs photodiode or an InGaAsP photodiode and the laser is an InGaAsP laser.

12. An LD/PD module as claimed in claim 1, wherein a distance between the guide pins is equal to a distance between holes of an MT connector or a mini-MT connector for enabling the module to attach the MT connector or the mini-MT connector.

13. An LD/PD module as claimed in claim 1, wherein incoming light is reflected by the filter, is introduced into a vertical path which meats the light guide at right angles and is detected by the photodiode.

14. An LD/PD module as claimed in claim 1, wherein the photodiode is a bottom-incidence type photodiode which is mounted on an end of a V-groove having a slanting end plane and incoming light is reflected by the slanting end plane and is introduced into the bottom of the photodiode.

15. An LD/PD module as claimed in claim 1, wherein a monitoring photodiode (PD) is mounted on an end of a V-groove having a slanting plane behind the LD and the light emitted from the LD backward is reflected at the slanting plane and is detected by the monitoring PD for stabilizing the output of the LD.

16. An LD/PD as claimed in claim 1, further comprising a pre-amplifier mounted on the platform for amplifying an output of the signal-sensing photodiode.

17. An LED/PD module comprising:

a planar platform;

a filter intersecting a light guide said filter constructed to partially transmit and partially reflect light which impinges thereon;

a photodiode (PD) constructed and arranged to detect power of light reflected by the filter;

a light emitting diode (LED) positioned at an extension of the light guide, said light emitting diode constructed and arranged to produce and introduce a signal light into the light guide;

the light guide being a non-Y-branched, straight light guide formed in the platform in a direct line from the extension of the light guide toward an edge of the platform; and a plurality of guide pins fixed to the platform to attach the platform to an optical connector having corresponding holes.

18. A LED/PD module as claimed in claim 17, wherein the light guide is a straight line waveguide formed on the platform by doping it with an impurity which enhances its refractive index, and wherein the filter is positioned at nearly 45 degrees to the light guide and is adapted to partially transmit and partially reflect light of a single wavelength.

19. A LED/PD module as claimed in claim 17, wherein the light guide is a straight line waveguide formed on the platform by doping it with an impurity which enhances its refractive index and the filter is positioned at nearly 30 degrees to the light guide and is adapted to partially transmit and partially reflect light of a single wavelength.

20. An LED/PD module as claimed in claim 17, wherein the light guide is a straight line waveguide formed on the platform by doping it with an impurity which enhances its refractive index and the filter is positioned at nearly 45 degrees to the light guide and is a WDM filter which is adapted to divide light of two different wavelengths by reflecting one wavelength light at nearly 100% and allowing the other wavelength light to pass at nearly 100%.

21. An LED/PD module as claimed in claim 17, wherein the light guide is a straight line waveguide formed on the platform by doping it with an impurity which enhances its refractive index and the filter is positioned at nearly 30 degrees to the light guide, is a WDM filter which is adapted to divide light of two different wavelengths by reflecting one wavelength light at nearly 100% and allowing the other wavelength light to pass at nearly 100%.

22. An LED/PD module as claimed in claim 17, wherein the light guide is an $SiO_2$ waveguide which is produced by doping $SiO_2$ with an impurity for enhancing the refractive index thereof.

23. An LED/PD module as claimed in claim 17, wherein the light guide is a transparent plastic waveguide.

24. An LED/PD module as claimed in claim 17, wherein the filter includes a transparent plastic substrate and dielectric multilayers piled on the transparent plastic substrate.

25. An LED/PD module as claimed in claim 17, wherein the filter includes a transparent glass substrate and dielectric multilayers piled on the transparent glass substrate.

* * * * *